(12) United States Patent
Kim

(10) Patent No.: US 11,883,701 B2
(45) Date of Patent: Jan. 30, 2024

(54) FIRE EXTINGUISHING CAPSULE AND CAPSULE-TYPE FIRE EXTINGUISHING DEVICE INCLUDING SAME

(71) Applicant: Byung Yul Kim, Cheongju-si (KR)

(72) Inventor: Byung Yul Kim, Cheongju-si (KR)

(73) Assignees: FIREKIM CO., LTD., Cheongju-si (KR); Byung Yul Kim, Cheongju-si (KR)

( * ) Notice: Subject to any disclaimer, the term of this patent is extended or adjusted under 35 U.S.C. 154(b) by 824 days.

(21) Appl. No.: 16/614,431

(22) PCT Filed: Aug. 1, 2017

(86) PCT No.: PCT/KR2017/008267
§ 371 (c)(1),
(2) Date: Nov. 18, 2019

(87) PCT Pub. No.: WO2018/225893
PCT Pub. Date: Dec. 13, 2018

(65) Prior Publication Data
US 2020/0197734 A1    Jun. 25, 2020

(30) Foreign Application Priority Data

Jun. 5, 2017 (KR) .......................... 10-2017-0069623
Jun. 5, 2017 (KR) .......................... 10-2017-0069624
Jun. 5, 2017 (KR) .......................... 10-2017-0069625

(51) Int. Cl.
*A62C 37/14* (2006.01)
*A62C 35/13* (2006.01)
*A62C 37/36* (2006.01)

(52) U.S. Cl.
CPC .............. *A62C 37/14* (2013.01); *A62C 35/13* (2013.01); *A62C 37/36* (2013.01)

(58) Field of Classification Search
CPC ......... A62C 35/10; A62C 35/11; A62C 35/13; A62C 37/10; A62C 37/11; A62C 37/14;
(Continued)

(56) References Cited

U.S. PATENT DOCUMENTS 1,236,622 A  *  8/1917  Taylor .................. A62C 35/605
                                                      169/26
3,300,037 A  *  1/1967  De Santis ................ H01J 9/38
                                                      29/422
(Continued)

FOREIGN PATENT DOCUMENTS

CN           201453899 U       5/2010
CN           205886027 U       1/2017
(Continued)

OTHER PUBLICATIONS

PCT International Search Report for International Application No. PCT/KR2017/008267, dated Oct. 17, 2018, 7 pages.
(Continued)

*Primary Examiner* — Darren W Gorman
(74) *Attorney, Agent, or Firm* — Hoffman Warnick LLC

(57) ABSTRACT

Disclosed are an extinguishing capsule and a capsule type fire extinguisher including the same, the capsule type fire extinguisher including at least one extinguishing module including a housing configured to receive an extinguishing capsule therein, the extinguishing capsule including an extinguishing material that expands when heat is applied thereto, the at least one extinguishing module configured to release the extinguishing material from the housing to suppress fire, and a main module configured to control the at least one extinguishing module and bidirectionally communicate a fire situation to a fire station or a user terminal.

10 Claims, 10 Drawing Sheets

(58) Field of Classification Search
CPC ......... A62C 37/36; A62C 37/38; A62C 37/40; A62C 37/46; A62C 37/48
USPC .......................................................... 169/26
See application file for complete search history.

(56) References Cited

U.S. PATENT DOCUMENTS

| | | | | |
|---|---|---|---|---|
| 4,609,047 | A * | 9/1986 | Pieczykolan | A62C 37/14 169/38 |
| 4,619,327 | A * | 10/1986 | Pieczykolan | A62C 37/14 169/38 |
| 5,361,847 | A * | 11/1994 | Phelps | A62C 3/00 169/61 |
| 5,613,562 | A | 3/1997 | Galbraith et al. | |
| 9,539,451 | B1 * | 1/2017 | Walker | B05B 1/326 |
| 2004/0194976 | A1 * | 10/2004 | Kretzschmar | A62C 37/14 169/42 |
| 2013/0220650 | A1 * | 8/2013 | Muller | A62C 37/14 169/58 |
| 2017/0028237 | A1 * | 2/2017 | Klug | A62C 37/14 |
| 2017/0113081 | A1 | 4/2017 | Muller et al. | |

FOREIGN PATENT DOCUMENTS

| | | |
|---|---|---|
| DE | 10017670 A1 | 12/2001 |
| GB | 2349084 A | 10/2000 |
| JP | S5174399 U | 6/1976 |
| KR | 20030007163 | 3/2003 |
| KR | 20060025778 A | 3/2006 |
| KR | 20130054084 A | 5/2013 |
| KR | 101628708 B1 | 6/2016 |
| KR | 101643211 B1 | 7/2016 |
| WO | 2017074026 A1 | 5/2017 |

OTHER PUBLICATIONS

European Search Report for Application No. 17751979.0, dated May 17, 2021, 19 pages.

* cited by examiner

300

FIRE EXTINGUISHING CAPSULE AND CAPSULE-TYPE FIRE EXTINGUISHING DEVICE INCLUDING SAME

TECHNICAL FIELD

Embodiments relate to an extinguishing capsule and a capsule type fire extinguisher including the same.

BACKGROUND ART

Fire detectors are installed in a large building and a tenement such as an apartment to report fire in case of fire. A fire detector detects an outbreak of fire through a sensor using heat, smoke, or flame caused by fire, warns people concerned or residents by issuing a fire alarm using a sound device such as a bell or a siren, and automatically controls sprinklers, which are indoor and outdoor fire extinguishers, based on a fire signal to suppress fire.

However, a general fire detector needs to search for a fire extinguisher to extinguish fire, and thus it is difficult to extinguish fire quickly and fire may spread. Further, fire may be suppressed only at a position at which a fire extinguisher is installed, and fire may rather spread in case of oil fire or electricity fire.

In particular, there are a lot of devices using electricity as driving power, and fire accidents caused by short circuits in electric outlets, switch boxes, lighting devices, and electronic products occur frequently.

Thus, a fire extinguisher that may be simply installed at a position at which an outbreak of fire is expected, extinguish fire at an early stage by automatically releasing an extinguishing material in response to fire, and prevent a spread of fire by blocking gas or electricity in case of fire is needed.

DISCLOSURE OF INVENTION

Technical Goals

To solve the above issues, an aspect provides an extinguishing capsule and a capsule type fire extinguisher including the same that may be simply configured, be simply installed at a position at which fire is likely to break out, and automatically release an extinguishing material in case of fire.

Further, an aspect also provides an extinguishing capsule and a capsule type fire extinguisher including the same that may prevent a spread of fire by blocking gas or electricity in case of fire.

Further, an aspect also provides an extinguishing capsule and a capsule type fire extinguisher including the same that may reduce loss of lives and properties by extending the golden time which is an initial response time in case of fire.

Further, an aspect also provides an extinguishing capsule and a capsule type fire extinguisher including the same that may report an outbreak of fire by transmitting a fire situation to a user terminal or a fire station at an early stage in case of fire.

Technical Solutions

According to an aspect, there is provided an extinguishing capsule including an extinguishing material configured to expand by heat, and a pocket including a heating element configured to heat and apply heat to the extinguishing material when electricity is applied thereto, the pocket configured to receive the extinguishing material therein, and burst to release the extinguishing material when the extinguishing material expands.

The pocket may further include an inner layer and an outer layer, and the heating element may be provided partially or entirely between the inner layer and the outer layer.

According to an aspect, there is provided an extinguishing capsule including an extinguishing material including a first extinguishing material configured to suppress fire, and a second extinguishing material configured to expand when the temperature increases, a pocket configured to receive the extinguishing material therein, and a separation membrane configured to isolate the first extinguishing material and the second extinguishing material separately in the pocket, and transmit the second extinguishing material to the first extinguishing material when the second extinguishing material expands.

The second extinguishing material may be provided in a form of fluid, and expand to evaporate when the temperature increases.

The separation membrane may include a perforated material that blocks the second extinguishing material when the second extinguishing material is in the form of fluid and passes the second extinguishing material when the second extinguishing material evaporates.

The separation membrane may include a burst groove configured to burst before the pocket bursts when the second extinguishing material expands.

According to an aspect, there is provided a capsule type fire extinguisher including at least one extinguishing module including a housing configured to receive an extinguishing capsule therein, the extinguishing capsule including an extinguishing material that expands when heat is applied thereto, the at least one extinguishing module configured to release the extinguishing material from the housing to suppress fire, and a main module configured to control the at least one extinguishing module and bidirectionally communicate a fire situation to a fire station or a user terminal.

The main module may include a detector including at least one sensor to detect the fire situation, a controller configured to control the extinguishing module and a breaker when the fire situation is detected, and a communicator configured to bidirectionally communicate the fire situation or a control signal of the controller to the user terminal, the fire station, or the breaker.

The controller may be configured to control a release of the extinguishing material when the communicator receives an operating signal of the extinguishing module from the user terminal or the fire station.

The detector may include at least one of a temperature sensor, a humidity sensor, a smoke sensor, and a flame sensor.

The controller may be configured to control the release of the extinguishing material based on a level of at least one of temperature, humidity, smoke, and flame sensed by the detector.

The main module may further include an attaching portion which the at least one sensor is to be attached to and detached from, and the attaching portion may be attachable to and detachable from the main module to replace the at least one sensor.

The housing may include a plurality of release holes, through which the extinguishing material is released, on an entire outer surface thereof.

The housing may include the plurality of release holes on a portion of the outer surface thereof such that the extinguishing material may be released intensively toward a predetermined portion in which fire breaks out.

The extinguishing capsule may include a heating element configured to heat by electricity, and the extinguishing module may further include a connecting holder configured to be electrically connected to one end of the extinguishing capsule.

Effects

According to embodiments, by simplifying a configuration of a fire extinguisher, the fire extinguisher may be simply installed at a position at which fire is likely to break out, and an extinguishing material may be released automatically in case of fire.

Further, a spread of fire may be prevented by blocking gas or electricity in case of fire.

Further, loss of lives and properties may be reduced by extending the golden time which is an initial response time in case of fire.

Further, an outbreak of fire may be reported by transmitting a fire situation to a user terminal or a fire station at an early stage in case of fire.

BEST MODE FOR CARRYING OUT THE INVENTION

Figure 1:
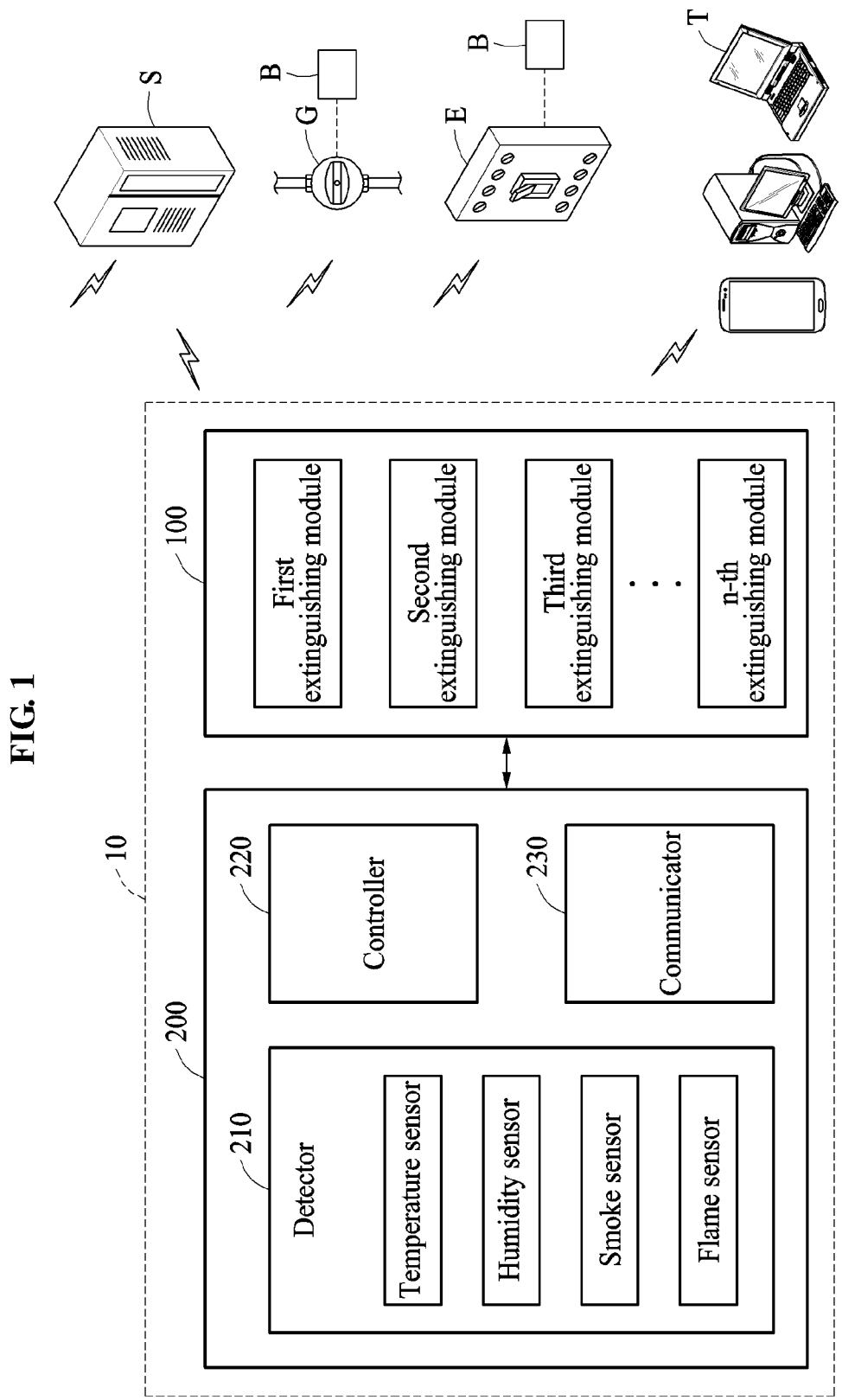
FIG. 1 is a block diagram illustrating a configuration of a capsule type fire extinguisher according to an embodiment.

Hereinafter, embodiments of the present disclosure will be described with reference to the accompanying drawings. Regarding the reference numerals assigned to the components in the drawings, it should be noted that the same components will be designated by the same reference numerals, wherever possible, even though they are shown in different drawings. Also, in the description of the embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. Each of these terms is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

The same name may be used to describe a component included in an embodiment and a component having a common function in another embodiment. Unless otherwise mentioned, the description on the embodiment may be applicable to the other embodiment and thus, duplicated description will be omitted for conciseness.

Hereinafter, a capsule type fire extinguisher will be described in detail with reference to FIGS. 1 through 9.

FIG. 1 is a block diagram illustrating a configuration of a capsule type fire extinguisher according to an embodiment.

Referring to FIG. 1, a capsule type fire extinguisher 10 may operate based on the Internet of Things (IoT). For example, the capsule type fire extinguisher 10 may control an extinguishing module 100 based on a location of fire to extinguish the fire. Further, the capsule type fire extinguisher 10 may report a fire situation to a user terminal and a fire station in case of fire, and control a blocking operation with respect to an object that may cause secondary fire. The capsule type fire extinguisher 10 may include the extinguishing module 100 and a main module 200.

The extinguishing module 100 may receive an extinguishing capsule 300 including an extinguishing material 310 that expands when heat is applied thereto. Further, the extinguishing module 100 may suppress fire by releasing the extinguishing material 310. At least one extinguishing module 100 may be provided, and each extinguishing module 100 may be connected to the main module 200. Hereinafter, a configuration of the extinguishing module 100 will be described further with reference to FIGS. 3 through 7.

The main module 200 may control the at least one extinguishing module 100, and bidirectionally communicate a fire situation to a fire station S and a user terminal T. Thus, the capsule type fire extinguisher 10 may detect the fire situation at an early stage, extinguish the fire through the extinguishing module 100 at an early stage, and report the fire situation to the fire station S and a user at an early stage through the bidirectional communication with the fire station S and the user terminal T.

The main module 200 may include a detector 210, a controller 220, and a communicator 230.

The detector 210 may include at least one sensor, and detect a fire situation. For example, the detector 210 may include at least one of a temperature sensor, a humidity sensor, a smoke sensor, and a flame sensor. The detector 210 may detect the fire situation by sensing at least one of temperature, humidity, smoke, and flame, and measure a level of at least one of the temperature, the humidity, the smoke, and the flame. Here, the level refers to a quantity of state of temperature, humidity, smoke, and flame being sensed.

When the detector 210 detects the fire situation, the controller 220 may control the extinguishing module 100 and a breaker B. For example, when the detector 210 detects the fire situation, the controller 220 may control the extinguishing material 310, 320 to expand to be released from the extinguishing module 100 by applying heat to the extinguishing capsule 300. Further, the controller 220 may control the breaker B to block objects that may cause a spread of fire in case of fire, for example, a gas valve G or a distribution panel E. For example, when fire breaks out, the controller 220 may generate a blocking signal and transmit the blocking signal through the communicator 230. The blocking signal transmitted through the communicator 230 may be used to control the breaker B disposed in the gas valve G or the distribution panel E to block the gas valve G or the distribution panel E. Thus, the controller 220 may prevent a spread of fire caused by gas leak and electrical fire.

The breaker B may block a gas pipeline by closing the gas valve G of the gas pipeline. The breaker B may cut off power of the distribution panel E. The breaker B may include a communication device (not shown) to communicate with the communicator 230. The communication device of the breaker B may communicate using the same communication method as the communicator 230. The communication method will be described later when describing the communicator 230.

The communicator 230 may bidirectionally communicate the fire situation detected by the detector 210 or a control signal of the controller 220 to the user terminal T, the fire station S, or the breaker B. For example, when the fire situation is detected by the detector, the controller may transmit the fire situation to the user terminal or the fire station to quickly cope with the fire situation.

Further, the communicator 230 may bidirectionally communicate with the breaker B to block the gas valve G or cut off the power of the distribution panel E. The communicator 230 may verify whether the breaker B operates appropriately and report information related thereto to the user terminal T or the fire station S. In addition, since the communicator 230 may bidirectionally communicate with the user terminal T or the fire station S, the communicator 230 may receive an operating signal of the breaker B from the user terminal T or the fire station S and transmit the operating signal to the breaker B, thereby controlling an operation of the breaker B. Further, the communicator 230 may control an operation of the extinguishing module through the user terminal T.

The communication method of the communicator 230 may be a communication method using wireless-fidelity (Wi-Fi), Bluetooth and third generation (3G) data communication networks, Zigbee, Beacon, WCMDA, and other wired/wireless communication networks.

The user terminal T may be a personal computer (PC), a laptop, a personal digital assistant (PDA), a mobile terminal, or a smart TV. The user terminal T may receive the fire situation from the communicator 230, and generate and transmit the operating signal of the breaker B. Further, the user terminal T may generate and transmit an operating signal of the extinguishing module 100.

Here, the fire station S may include the Central Fire Service, local fire departments, the Fire Service Academy, fire stations, and 119 centers, and in general an ordinary fire station may correspond to a representative example of the fire station S. In the fire station S, the fire situation transmitted from the communicator 230 may be verified through a user terminal T of a firefighter that is connected to a fire server interoperating with the fire station S. That is, the fire station S that bidirectionally communicates with the communicator 230 may refer to the fire server interoperating with the fire station S. Further, to cope with the fire situation, the firefighter may operate the extinguishing module 100 through the user terminal T of the firefighter.

The firefighter commonly refers to a person who suppresses fire, rescues human lives, aids emergency patients, prevents disaster, copes with disaster, and helps recovery from disaster, for example, a fire officer, a conscripted firefighter, or a volunteer firefighter.

The capsule type fire extinguisher 10 including the above configuration may extinguish fire in case of fire, and prevent a spread of fire even when the fire is not completely extinguished, thereby extending the golden time which is an initial response time, and reducing loss of lives and properties.

Figure 2:
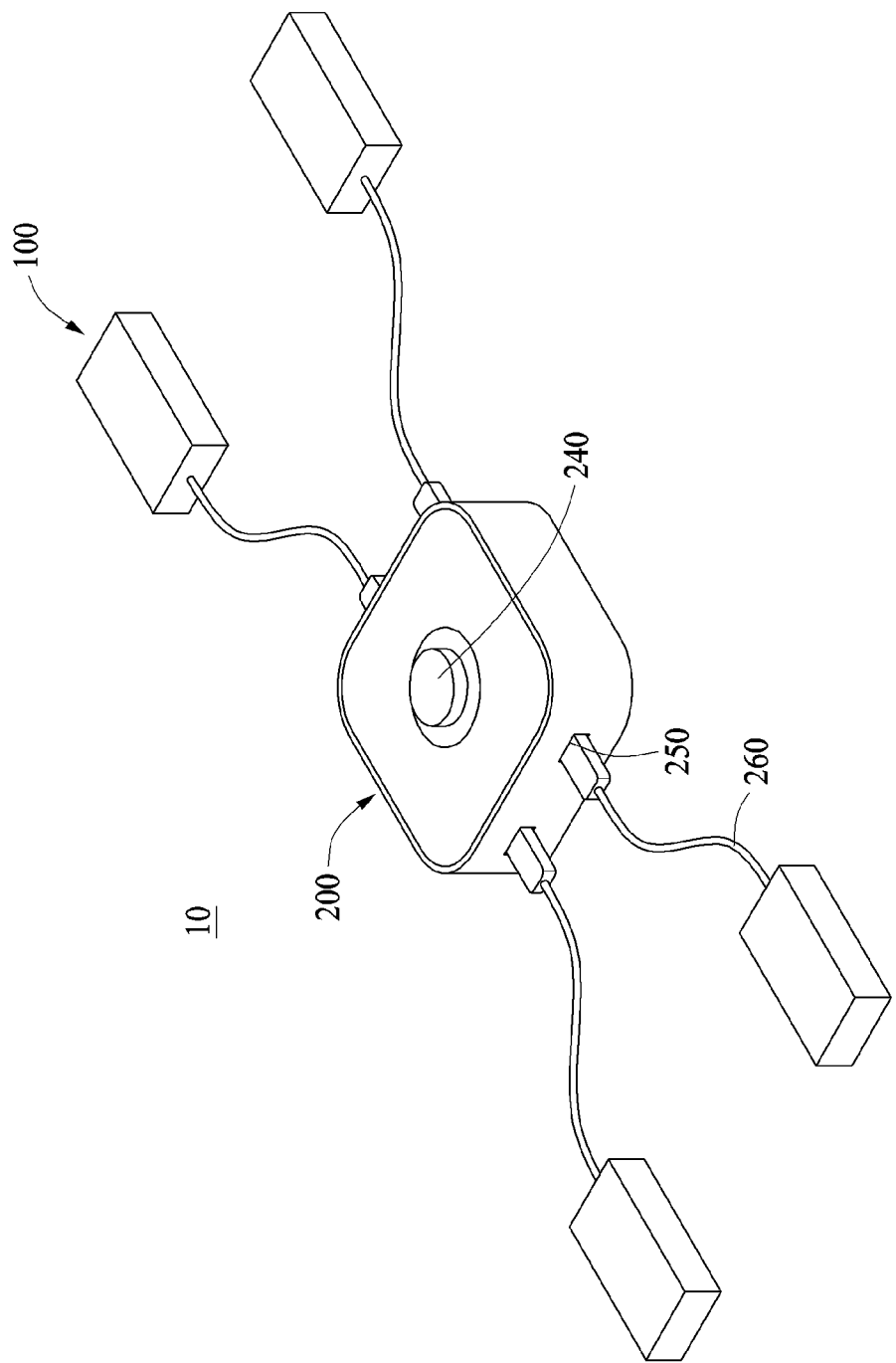
FIG. 2 is a perspective view illustrating a capsule type fire extinguisher according to an embodiment.

FIG. 2 is a perspective view illustrating a capsule type fire extinguisher according to an embodiment.

Referring to FIG. 2, the main module 200 may further include an attaching portion 240, a first connector 250, and a cable 260.

The attaching portion 240 is detachably disposed on one side of the main module 200. At least one sensor may be attached to and detached from the attaching portion 240. That is, the attaching portion 240 may enable the detector 210 to be attached to and detached from the main module 200. For example, the attaching portion 240 may be electrically connected to the main module 200. Further, at least one slot (not shown) to which the sensor is electrically connected may be provided in the attaching portion 240, whereby the sensor may be attached thereto and detached therefrom. The attaching portion 240 may enable the user to selectively attach and detach a sensor thereto and therefrom. Thus, a cost for purchasing the fire extinguisher 10 may be reduced, and a sensor may be selected based on a location of disposition.

The main module 200 may include at least one first connector 250, and be connected to the at least one extinguishing module 100 through the cable 260 connected to the first connector 250. The first connector 250 and the cable 260 may include all connectors and all cables that may enable transmission of power and signals. For example, the cable 260 may be a universal serial bus (USB) cable that may be easily obtained, and the first connector 250 may be a USB port.

The main module 200 may be connected to an external power supply to receive power therefrom, or a battery may be included in the main module 200 to supply power thereto.

Figure 3:
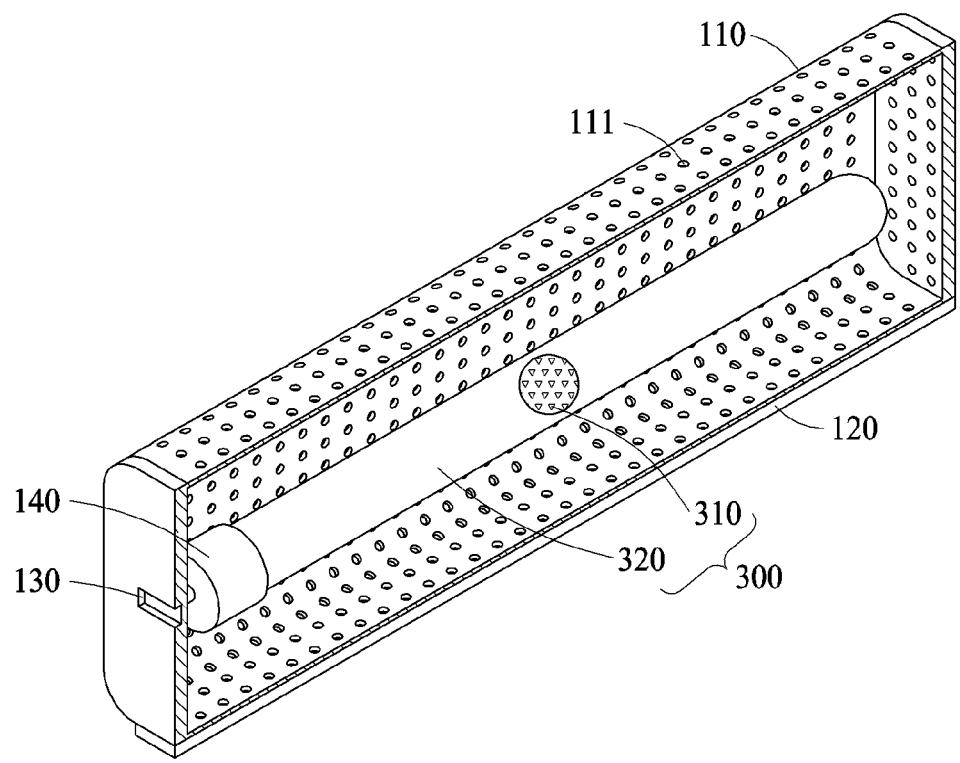
FIG. 3 is a cross-sectional view illustrating an extinguishing module according to an embodiment.

FIG. 3 is a cross-sectional view illustrating an extinguishing module according to an embodiment.

Referring to FIG. 3, the extinguishing module 100 may receive the extinguishing capsule 300 therein, and suppress fire by releasing the extinguishing material 310 provided in the extinguishing capsule 300. The extinguishing module 100 may include a housing 110, a fixing portion 120, a second connector 130, and a connecting holder 140.

The housing 110 may store the extinguishing capsule 300 therein. For example, the housing 110 may include a receiving space to receive the extinguishing capsule 300 therein. The shape of the housing 110 is not limited, and may include any shape that includes a plurality of release holes 111 to release the extinguishing material 310 therethrough and thereby may effectively extinguish fire.

The plurality of release holes 111 may be open to allow fluid communication between inside and outside of the housing 110 so as to release the extinguishing material 310 from the extinguishing module 100 when the extinguishing material 310 expands and bursts to be released from the extinguishing capsule 300. The plurality of release holes 111 may be provided on the entire housing 110.

The fixing portion 120 may be disposed on one side of the housing 110, and may be attached to and detached from a predetermined location, for example, wall or pipeline. The fixing portion 120 may include various members such as a double sided tape, an adhesive film, a bracket, and a screw, and also include various adhesives that solidify from a fluid or semi-liquid state and thereby make two objects stick together.

The second connector 130 may be a connector that is electrically connected to the main module 200 through the cable 260. For example, in a case in which the cable 260 to be connected to the main module 200 is a USB cable, the second connector 130 may be a USB port.

The connecting holder 140 may be electrically connected to one side of the extinguishing capsule 300. For example, the connecting holder 140 may be connected to the second connector 130 and apply electricity transmitted from the main module 200 to the extinguishing capsule 300. The shape of the connecting holder 140 is not limited, and may include any shape that may support and fix the extinguishing capsule 300 and electrically connect the connecting holder 140 to the extinguishing capsule 300.

Figure 4:
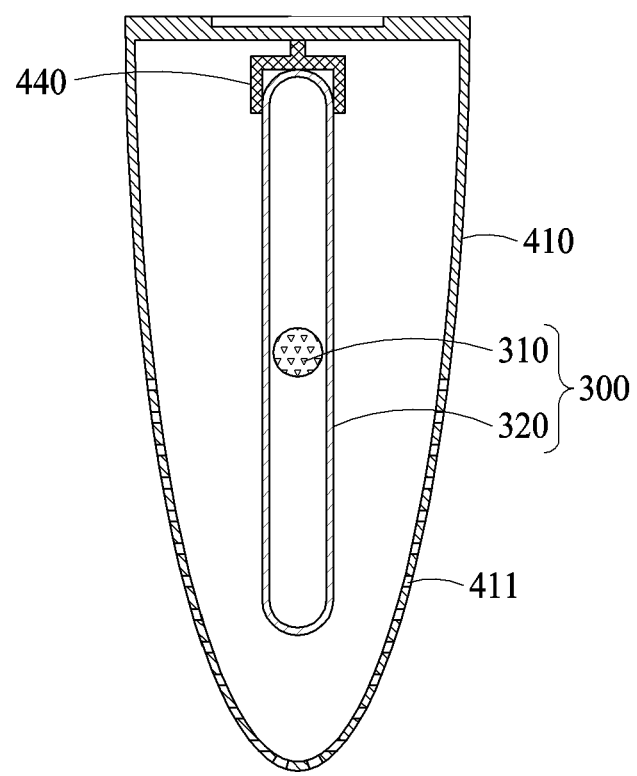
FIG. 4 is a cross-sectional view illustrating an extinguishing module according to another embodiment.

FIG. 4 is a cross-sectional view illustrating an extinguishing module 400 according to another embodiment.

Referring to FIG. 4, a housing 410 may be provided in a shape including a lower portion of which a cross section decreases gradually. For example, the lower portion of the housing 410 may be provided in a shape of "U", "V", or a hemisphere so as to increase a releasing direction of the extinguishing material 310.

A plurality of release holes 411 may be provided in a portion of the housing 410 such that the extinguishing material 310 may be released intensively toward a predetermined portion in which fire breaks out. For example, the extinguishing module 400 may be disposed above a portion in which an outbreak of fire is expected, for example, an electric outlet or a gas stove, such that a longitudinal direction of the extinguishing module 400 may be perpendicular to the ground. In this example, the plurality of release holes 411 may be provided intensively on an outer surface of the lower portion of the housing 410. The plurality of release holes 411 may concentrate the release of the extinguishing material 310 on a lower side, whereby fire breaking out under the extinguishing module 400 may be effectively extinguished.

The embodiments illustrate an example of separately providing the plurality of extinguishing modules 100, 400 and the main module 200 configured to control the plurality of extinguishing modules 100, 400. However, a single extinguishing module 100, 400 and a single main module 200 may be provided as an integral body.

The extinguishing capsule 300 may include the extinguishing material 310 and a pocket 320.

The extinguishing material 310 may expand by heat. For example, the extinguishing material 310 may include various materials that evaporate when heated. The extinguishing material 310 may be Novec 1230 which is a fluorinated kotone fluid. When the extinguishing material 310 is heated and expands, the extinguishing material 310 may burst to be released from the pocket 320 and extinguish the fire through the release holes 111 of the housing 110.

Figure 5:
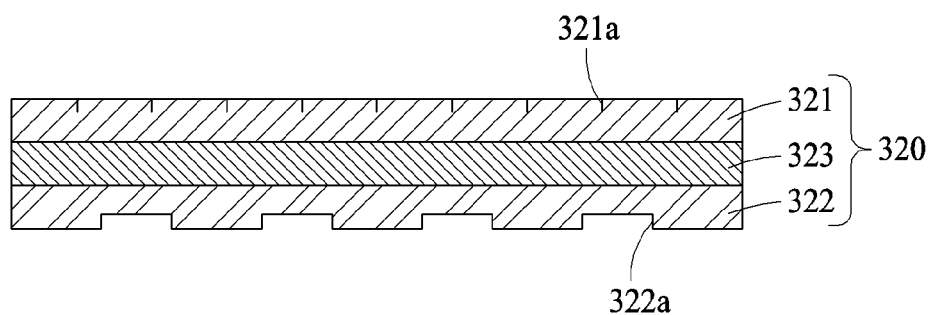
FIG. 5 is a cross-sectional view illustrating a configuration of a pocket of an extinguishing capsule according to an embodiment.

FIG. 5 is a cross-sectional view illustrating a configuration of a pocket of an extinguishing capsule according to an embodiment.

Referring to FIG. 5, the pocket 320 may include an outer layer 321, an inner layer 322, and a heating element 323.

The outer layer 321 may be provided to enclose the inner layer 322 to protect the extinguishing material 310 from an external impact and contamination. The outer layer 321 may include polypropylene (PP), oriented polypropylene (OPP), polyvinyl chloride (PVC), or polyethylene terephthalate (PET). Information related to the extinguishing material and information related to a product design and a manufacturer may be printed on one side of the outer layer 321.

The outer layer 321 may include a burst guide 321a. The burst guide 321a may be provided on the entire outer surface of the outer layer 321 to guide a burst of the outer layer 321 when the extinguishing material 310 expands. For example, the burst guide 321a may be a microgroove provided in a form of broken line. The burst guide 321a may be uniformly provided on the entire outer surface of the outer layer 321. When the extinguishing material 310 expands, the burst guide 321a may guide the entire pocket 320 to burst uniformly such that the extinguishing material 310 may be released uniformly from the entire pocket 320.

The inner layer 322 may protect the extinguishing material 310 from heat. For example, the inner layer 322 may include an aluminum material that may protect the extinguishing material 310 from heat. The inner layer 322 of the aluminum material may block ultraviolet rays, protect the extinguishing material 310 from heat, and improve a compressibility of the pocket 320.

The inner layer 322 may include a plurality of concavo-convex portions 322a. For example, the plurality of concavo-convex portions 322a may be provided on the entire inner layer 322 to enable the pocket 320 to uniformly burst when the extinguishing material 310 expands. That is, when the extinguishing material 310 expands, the extinguishing material 310 may burst to be released through a concave portion of the pocket 320 which is provided in a thin thickness and thus has a weakest durability.

Concave portions having thin thickness may be provided at the same positions of the burst guide 321a of the outer layer 321 and the concavo-convex portions 322a of the inner layer 322. The burst guide 321a and the concavo-convex portions 322a may change the thickness of the pocket 320, thereby reducing a response time that it takes for the pocket 320 to burst. Further, a reactivity may increase by heat of the heating element 323 in the concave portion of the inner layer 322a. Thus, the extinguishing material 310 may expand more quickly, whereby fire may be suppressed at an early stage.

In the drawings according to the present embodiment, the burst guide 321a and the concavo-convex portions 322a are provided in the entire outer layer 321 and the entire inner layer 322, respectively. However, embodiments are not limited thereto. The burst guide 321a and the concavo-convex portions 322a may be provided in a portion thereof to face a portion subject to fire extinguishment. In this example, a releasing direction and a releasing range of the extinguishing material 310 may be controlled to correspond to a portion of the pocket 320 in which the extinguishing material 310 is to expand and burst.

The heating element 323 may apply heat to the extinguishing material 310. The heating element 323 may be provided between the outer layer 321 and the inner layer 322. For example, the heating element 323 may be provided partially or entirely between the outer layer 321 and the inner layer 322 to uniformly apply heat to the entire extinguishing material 310. A portion of the heating element 323 may extend to outside of the outer layer at a portion connected to the connecting holder 140, thereby facilitating electricity application.

The heating element 323 may heat by electricity. For example, the heating element 323 may include nickel, copper, nichrome carbon fiber, and carbon that may heat when electricity is applied thereto.

The extinguishing capsule 300 may include the heating element 323 in the pocket 320, and thus the fire extinguisher 10 may be provided in a simple structure that may apply electricity to the extinguishing capsule 300 and thereby minimize its self weight. Further, the fire extinguisher 10 may expand the extinguishing material 310 by applying electricity to the heating element 323 through the controller 220 at a point in time at which fire breaks out, and thus the fire extinguisher 10 may extinguish the fire at an early stage, and reduce a spread of the fire even when the fire is not completely extinguished, thereby extending the golden time.

Figure 6:
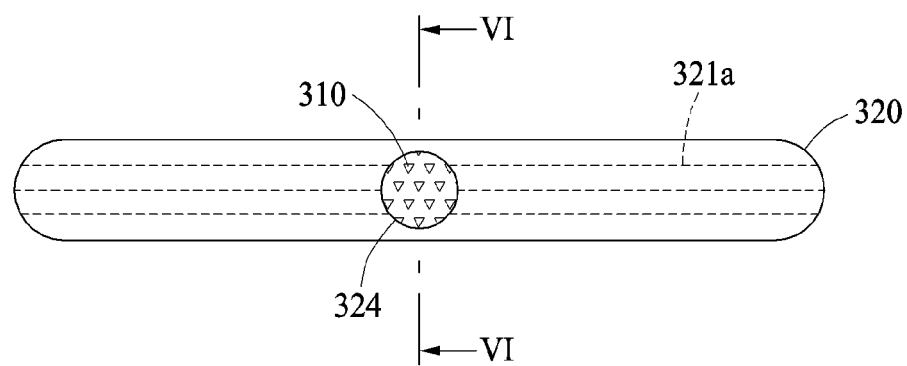
FIG. 6 is a plan view illustrating an extinguishing capsule including a transparent window according to an embodiment.
Figure 7:
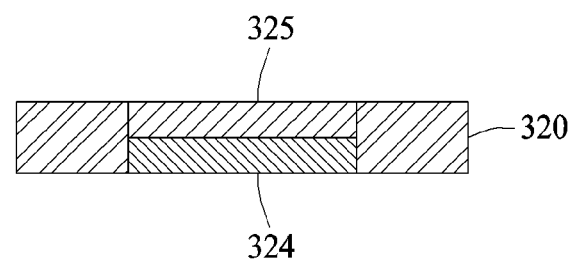
FIG. 7 is a cross-sectional view illustrating a configuration of a packet including a transparent window according to an embodiment.

FIG. 6 is a plan view illustrating the extinguishing capsule 300 including a transparent window according to an embodiment, and FIG. 7 is a cross-sectional view illustrating a configuration of the packet 320 including a transparent window 324 according to an embodiment.

Referring to FIGS. 6 and 7, the pocket 320 may further include the transparent window 324 and a protecting film 325.

The transparent window 324 may be transparent such that an inside of the pocket 320 may be viewed with naked eyes. At a portion in which the transparent window 324 is provided may not include the heating element 323. The shape of the transparent window 324 is not limited, and may include any shape which may enable the extinguishing material 310 to be viewed with naked eyes. Due to a characteristic of the extinguishing material 310, the liquid extinguishing material naturally evaporates when a period of use of the product expires, and thus may be released from the pocket 320. The transparent window 324 may enable the extinguishing material 310 to be viewed therethrough, and thus a replacement time of the extinguishing capsule 300 may be recognized.

Since a portion including the transparent window 324 is thinner than another portion and thus may burst before the pocket 320 bursts, the protecting film 325 may be disposed on one side of the transparent window 324 to prevent the foregoing. For example, the protecting film 325 may supplement the thickness of the transparent window 324 such that the entire pocket 320 may burst uniformly in response to the expansion of the extinguishing material 310. That is, the protecting film 325 may be attached to the transparent window 324 to form a breaking strength equal to a breaking strength of the pocket 320, thereby enabling the entire pocket 320 to burst uniformly.

As shown in the embodiment, the protecting film 325 having the same size as the transparent window 324 may be attached to the transparent window 324. However, the embodiment is not limited thereto. The protecting film 325 may also be formed to be greater than the transparent window 324 and attached to the pocket 320.

Figure 8:
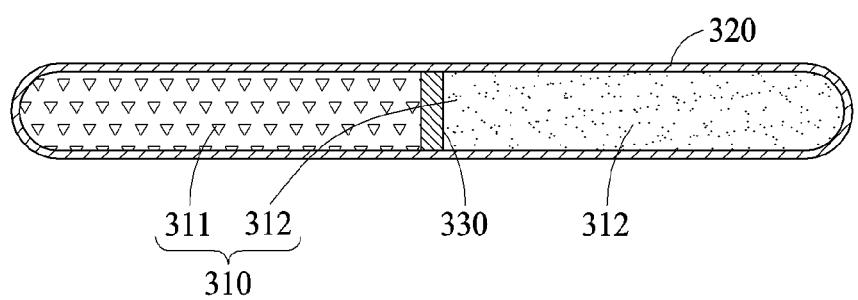
FIG. 8 is a cross-sectional view illustrating an internal configuration of an extinguishing capsule according to an embodiment.

FIG. 8 is a cross-sectional view illustrating an internal configuration of an extinguishing capsule according to an embodiment.

Referring to FIG. 8, the extinguishing material 310 may include a first extinguishing material 311 and a second extinguishing material 312.

The first extinguishing material 311 may be a fire extinguishing medium. For example, the first extinguishing material 311 may be fine powder of various chemical materials. The first extinguishing material 311 may be dry chemical powder. The first extinguishing material 311 including the dry chemical powder may be used for most of fire situations, and may be used most widely due to its inexpensive cost.

The second extinguishing material 312 may expand when the temperature increases. For example, the second extinguishing material 312 may include various materials that evaporate when heated. The second extinguishing material 312 may be Novec 1230 which is a fluorinated kotone fluid. The second extinguishing material 312 may be provided initially in a liquid form, and may evaporate and expand when the temperature increases.

The extinguishing capsule 300 may further include a separation membrane 330 configured to separate the first extinguishing material 311 and the second extinguishing material 312 from each other.

The separation membrane 330 may isolate the first extinguishing material 311 and the second extinguishing material 312 separately in the pocket 320. When the second extinguishing material 312 expands, the separation membrane 330 may transmit the second extinguishing material 312 to the first extinguishing material 311. For example, the separation membrane 330 may include a perforated material that blocks fluid and passes only gas. The separation membrane 330 may be a melamine sponge material. Melamine sponge may pass gas, and thus may prevent a secondary damage from fire, that is, a release of poisonous gas caused by fire. Further, melamine sponge may be contraction-free.

Figure 9:
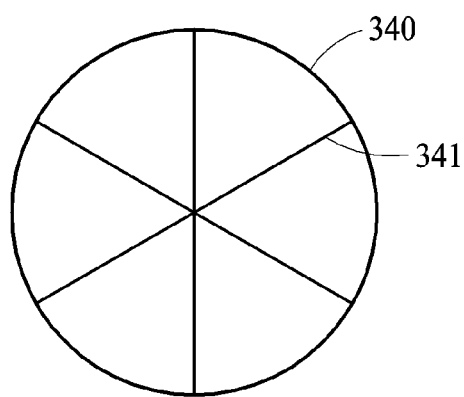
FIG. 9 is a cross-sectional view illustrating a configuration of a separation membrane of an extinguishing capsule according to another embodiment.

FIG. 9 is a cross-sectional view illustrating a configuration of a separation membrane of an extinguishing capsule according to another embodiment.

Referring to FIG. 9, a separation membrane 340 may include a burst groove 341 configured to burst before the pocket 320 bursts when the second extinguishing material 312 expands. For example, the separation membrane 340 may be a plastic resin material. The separation membrane 340 may be provided in a shape that isolates an inner portion of the pocket 320, and may include the burst groove 341. The burst groove 341 may be provided on one side or both sides of the separation membrane 340 to burst when the second extinguishing material 312 expands, such that the second extinguishing material 312 may be mixed with the first extinguishing material 311. That is, the burst groove 341 may be a linear groove formed to be thinner than the separation membrane 340. A breaking strength of the burst groove 341 may be lower than a breaking strength of the pocket 320, and thus the burst groove 341 may burst before the pocket 320 bursts when the second extinguishing material 312 expands, such that the second extinguishing material 312 may be mixed with the first extinguishing material 311. The mixture of the first extinguishing material 311 and the second extinguishing material 312 may be released when the pocket 320 bursts.

The first extinguishing material 311 may be provided in a form of solid powder. When mixed with the second extinguishing material 312 and received in the pocket 320, the first extinguishing material 311 may sink under the second extinguishing material 312 due to its self weight, and thus may lump when released. However, according to the embodiment, the first extinguishing material 311 and the second extinguishing material 312 may be mixed together immediately before released, and thus the first extinguishing material 311 may lump less.

The embodiments illustrate an example of the extinguishing capsule 300 including both the heating element 323 and the separation membrane 330, 340. However, the embodiments are not limited thereto. The extinguishing capsule 300 may include only the heating element 323, or include only the separation membrane 330, 340. For example, the extinguishing capsule 300 may not include the separation membrane 330, 340, and may include the extinguishing material 310, and the pocket 320 including the heating element 323.

Further, the extinguishing capsule 300 may not include the heating element 323, and may include the extinguishing material 310 including the first extinguishing material 311 and the second extinguishing material 312, the pocket 320, and the separation membrane 330, 340. In this example, since the extinguishing capsule 300 does not include the heating element 323, the extinguishing module 100 may not include the connecting holder 140, 440 and the second extinguishing material 312 may expand by heat of fire or other heating devices.

Figure 10:
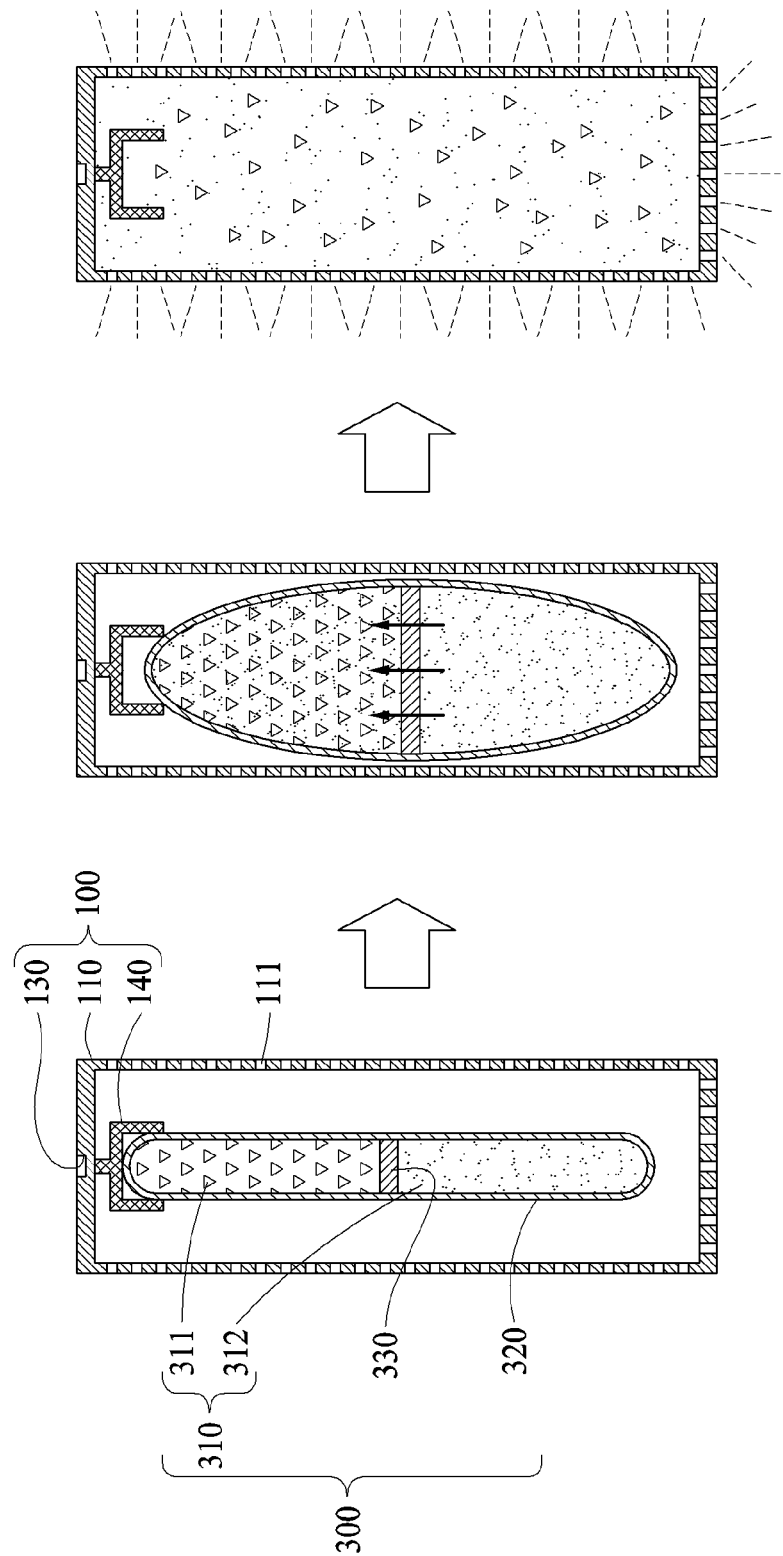
FIG. 10 illustrates an example of operation of an extinguishing module according to an embodiment.

Hereinafter, an example of operation of the extinguishing module 100 will be described with reference to FIG. 10. FIG. 10 illustrates an example of operation of the extinguishing module 100 according to an embodiment.

Referring to FIG. 10, the extinguishing module 100 connected to the main module 200 may be disposed at a position at which an outbreak of fire is expected. The main module 200 may sense at least one of temperature, humidity, smoke, and flame through the detector 210 when fire breaks out. The controller 220 may set a predetermined level to determine that fire breaks out, with respect to a level sensed by the detector 210. When the sensed level is greater than the predetermined level, electricity may be applied to the extinguishing module 100 through the first connector 250. The electricity may be transmitted to the second connector 130 connected to the first connector 250 with the cable 260, and the second connector 130 may transmit the electricity to the connecting holder 140. The connecting holder 140 receiving the electricity may apply the electricity to the heating element 323 of the extinguishing capsule 300 to heat the heating element 323. Thus, the second extinguishing material 312 of the extinguishing capsule 300 may expand by heat. The expanding second extinguishing material 312 may evaporate, pass through the separation membrane 330 of the melanin sponge material, and be mixed with the first extinguishing material 311.

The mixture of the first extinguishing material 311 and the second extinguishing material 312 may be released from the pocket 320 into the extinguishing module 100. The first extinguishing material 311 and the second extinguishing material 312 released from the pocket 320 may be released through the plurality of release holes 111 provided on the housing 110 to extinguish fire.

In the extinguishing capsule 300 of FIG. 9 according to the other embodiment, the separation membrane 340 may burst along the burst groove 341 in response to the expansion of the second extinguishing material 312 such that the first extinguishing material 311 and the second extinguishing material 312 may be mixed together.

The extinguishing capsule 300 may include the plurality of extinguishing materials 311 and 312, and thus may suppress various fires, for example, general fire (Class A), oil fire (Class B), and electricity fire (Class C). Further, since the fire extinguisher 10 includes the extinguishing material 310 that expands by heat, the extinguishing material 310 may be heated, expand, and be released by heat from the fire. In a case in which the level sensed by the detector 210 exceeds the predetermined level, the fire extinguisher 10 may heat the extinguishing material 310 to reduce a response time of the extinguishing material 310. Thus, in case of fire, fire may be extinguished effectively at an early stage.

According to embodiments, by simplifying the configuration of the capsule type fire extinguisher 10, the fire extinguisher 10 may be simply installed at a position at which fire is likely to break out, and the extinguishing material 310 may be released automatically in case of fire.

Further, the capsule type fire extinguisher may prevent a spread of fire by blocking gas or electricity in case of fire.

Further, the capsule type fire extinguisher may reduce loss of lives and properties by extending the golden time which is an initial response time in case of fire.

Further, the capsule type fire extinguisher may report an outbreak of fire by transmitting a fire situation to a user terminal or a fire station at an early stage in case of fire.

Although a few embodiments have been shown and described, the present disclosure is not limited to the described embodiments. Instead, it would be appreciated by those skilled in the art that changes may be made to these embodiments without departing from the principles and spirit of the disclosure, the scope of which is defined by the claims and their equivalents.

The invention claimed is:

1. An extinguishing capsule, comprising:
an extinguishing material configured to expand by heat; and
a pocket comprising a heating element configured to heat and apply heat to the extinguishing material when electricity is applied thereto, the pocket configured to receive the extinguishing material therein, and burst to release the extinguishing material when the extinguishing material expands,
wherein the pocket further comprises an inner layer and an outer layer and the heating element is provided partially or entirely between the inner layer and the outer layer,
wherein the inner layer and outer layer of the pocket are comprised of different materials, the outer layer is comprised of a material selected from a group consisting of:
polypropylene, oriented polypropylene, polyvinyl chloride, and polyethylene terephthalate; and the inner layer includes an aluminum material.

2. The extinguishing capsule of claim 1, wherein the extinguishing material includes a first extinguishing material configured to suppress fire and a second extinguishing material configured to expand as temperature increases.

3. The extinguishing capsule of claim 2, wherein the pocket includes a separation membrane isolating the first extinguishing material from the second extinguishing material within the pocket.

4. The extinguishing capsule of claim 3, wherein the separation membrane is configured to transmit the second extinguishing material to the first extinguishing material when the second extinguishing material expands.

5. The extinguishing capsule of claim 4, wherein the second extinguishing material is a fluid that evaporates as temperature increases.

6. The extinguishing capsule of claim 3, wherein the separation membrane is perforated.

7. The extinguishing capsule of claim 3, wherein the separation membrane includes a burst groove configured to burst before the pocket bursts as the second extinguishing material expands.

8. The extinguishing capsule of claim 1, wherein the pocket is compressible.

9. The extinguishing capsule of claim 1, wherein the outer layer includes a burst guide.

10. The extinguishing capsule of claim 1, wherein the inner layer includes a plurality of concavo-convex portions.

* * * * *